United States Patent
Pani et al.

(10) Patent No.: US 8,706,115 B2
(45) Date of Patent: Apr. 22, 2014

(54) METHOD FOR INTER-RADIO ACCESS TECHNOLOGY CELL RESELECTION

(75) Inventors: Diana Pani, Montreal (CA); Mohammed Sammour, Montreal (CA); Shankar Somasundaram, Deer Park, NY (US); Jin Wang, Central Islip, NY (US); Rajat P. Mukherjee, Montreal (CA)

(73) Assignee: Interdigital Technology Corporation, Wilmington, DE (US)

( * ) Notice: Subject to any disclaimer, the term of this patent is extended or adjusted under 35 U.S.C. 154(b) by 1433 days.

(21) Appl. No.: 12/141,356

(22) Filed: Jun. 18, 2008

(65) Prior Publication Data

US 2009/0088160 A1 Apr. 2, 2009

Related U.S. Application Data

(60) Provisional application No. 60/944,630, filed on Jun. 18, 2007, provisional application No. 60/950,734, filed on Jul. 19, 2007.

(51) Int. Cl.
*H04W 36/00* (2009.01)

(52) U.S. Cl.
USPC ........................................................ 455/436

(58) Field of Classification Search
CPC ..... H04W 36/08; H04W 36/10; H04W 36/14; H04W 36/16; H04W 36/18; H04W 36/24; H04W 36/30; H04W 36/36
USPC ................................................ 455/436, 437
See application file for complete search history.

(56) References Cited

U.S. PATENT DOCUMENTS

| 6,978,138 | B2 | 12/2005 | Japenga et al. | |
|---|---|---|---|---|
| 7,299,019 | B1 * | 11/2007 | Austin et al. | 455/161.3 |
| 2001/0011019 | A1 | 8/2001 | Jokimies | |
| 2004/0043769 | A1 * | 3/2004 | Amerga et al. | 455/437 |
| 2004/0116110 | A1 * | 6/2004 | Amerga et al. | 455/422.1 |
| 2006/0258386 | A1 * | 11/2006 | Jeong et al. | 455/525 |

(Continued)

FOREIGN PATENT DOCUMENTS

| CN | 1685754 A | 10/2005 |
|---|---|---|
| CN | 1689358 A | 10/2005 |

(Continued)

OTHER PUBLICATIONS

3rd Generation Partnership Project (3GPP), TS 25.133 V7.7.1, "3rd Generation Partnership Project; Technical Specification Group Radio Access Network; Requirements for support of radio resource management (FDD) (Release 7)", Mar. 2007,15 pages.

(Continued)

*Primary Examiner* — Wayne Cai
*Assistant Examiner* — Shantell L Heiber
(74) *Attorney, Agent, or Firm* — Condo Roccia Koptiw LLP

(57) ABSTRACT

A method for performing cell reselection first determines a current cell selection quality value. The cell selection quality value is compared to a predetermined threshold. Measurements of neighboring cells are taken if the cell selection quality value is less than or equal to the predetermined threshold. Measurements can be taken of intra-frequency cells, inter-frequency cells, and inter-radio access technology cells. If a neighboring cell is found that is better than the current cell based on the measurements, then the better neighbor cell is reselected to.

25 Claims, 4 Drawing Sheets

(56) References Cited

U.S. PATENT DOCUMENTS

| | | | |
|---|---|---|---|
| 2007/0004445 A1* | 1/2007 | Dorsey et al. | 455/525 |
| 2007/0030830 A1 | 2/2007 | Sagne et al. | |
| 2007/0097914 A1* | 5/2007 | Grilli et al. | 370/329 |
| 2008/0176564 A1* | 7/2008 | Eerolainen | 455/436 |
| 2008/0242301 A1* | 10/2008 | Osterling et al. | 455/436 |

FOREIGN PATENT DOCUMENTS

| | | | |
|---|---|---|---|
| EP | 0776588 A1 | 6/1997 | |
| JP | 2003-153325 A | 5/2003 | |
| RU | 2005108612 A | 8/2005 | |
| RU | 2265287 C2 | 11/2005 | |
| RU | 2006105411 A | 7/2006 | |
| WO | WO 96/06512 A1 | 2/1996 | |
| WO | WO 01/43462 A2 | 6/2001 | |
| WO | 2004/021732 | 3/2004 | |
| WO | WO 2004/021731 A2 | 3/2004 | |
| WO | WO 2004/021732 A2 | 3/2004 | |
| WO | 2004/040935 | 5/2004 | |
| WO | WO 2004/040935 A1 | 5/2004 | |
| WO | 2004/105255 | 12/2004 | |
| WO | WO 2005/020474 A1 | 3/2005 | |

OTHER PUBLICATIONS

European Telecommunications Standards Institute (ETSI), TS 125 304 V7.1.0, "Universal Mobile Telecommunications System (UMTS); User Equipment (UE) procedures in idle mode and procedures for cell reselection in connected mode (3GPP TS 25.304 version 7.1.0 Release 7)", Dec. 2006, 40 pages.

Drafting Group, "Drivers for Mobility Control Between LTE and GERAN", 3GPP Workshop LTE GSM Handovers, LGW-070034, (Sophia Antipolis, France, Jan. 10-11, 2007).

Ericsson, "On Inter-RAT Cell Reselection Principles", 3GPP TSG-RAN WG2 Meeting #58, R2-071833, (Kobe, Japan, May 7-11, 2007).

Ericsson, "Overview of RRM Measurements in E-UTRAN", 3GPP TSG-RAN WG (Radio) Meeting #41, R4-061158, (Riga, Estonia, Nov. 6-10, 2006).

Huawei, "Consideration on Cell Reselection", 3GPP TSG RAN WG2 #56, R2-063146, (Riga, Latvia, Nov. 6-10, 2006).

Nokia, "New Drivers for Cell Reselection Procedures in LTE", 3GPP TSG-RAn WG2 #55, R2-062899, (Seoul, South-Korea, Oct. 9-13, 2006).

NTT DOCOMO, Inc., "Multi-Band/Carrier Operation (2)—Load Balancing", 3GPP TSG RAN WG2 #54, R2-062172, (Tallinn, Estonia, Aug. 28-Sep. 1, 2006).

RAN WG2 Chairman, "Drivers for LTE Mobility Control", 3GPP Workshop LTE GSM Handovers, LGW-070026, (Sophia Antipolis, France, Jan. 10-11, 2007).

Third Generation Partnership Project, "Technical Specification Group Radio Access Network; User Equipment (UE) Procedures in Idle Mode and Procedures for Cell Reselection in Connected Mode (Release 7)", 3GPP TS 25.304, V7.1.0, (Dec. 2006).

Third Generation Partnership Project, "Technical Specification Group Radio Access Network; User Equipment (UE) Procedures in Idle Mode and Procedures for Cell Reselection in Connected Mode (Release 7)", 3GPP TS 25.304, V7.6.0, (May 2008).

Third Generation Partnership Project, "Technical Specification Group Radio Access Network; User Equipment (UE) Procedures in Idle Mode and Procedures for Cell Reselection in Connected Mode (Release 8)", 3GPP TS 25.304, V8.2.0, (May 2008).

Third Generation Partnership Project, "Technical Specification Group Radio Access Network; Evolved Universal Terrestrial Radio Access (E-UTRA); User Equipment (UE) Procedures in Idle Mode (Release 8)", 3GPP TS 36.304, V8.1.0, (Mar. 2008).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.0.0, (Mar. 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.4.0, (Mar. 2008).

* cited by examiner

METHOD FOR INTER-RADIO ACCESS TECHNOLOGY CELL RESELECTION

CROSS REFERENCE TO RELATED APPLICATIONS

This application claims the benefit of U.S. Provisional Patent Application No. 60/944,630 filed Jun. 18, 2007 and U.S. Provisional Patent Application No. 60/950,734 filed Jul. 19, 2007, which are incorporated by reference as if fully set forth herein.

FIELD OF INVENTION

This application is related to wireless communications.

BACKGROUND

The 3$^{rd}$ generation partnership project (3GPP) has initiated the Long Term Evolution (LTE) program to bring new technology, new network architecture and configuration, and new applications and services to the wireless cellular network to provide improved spectral efficiency, reduced latency, faster user experiences and richer applications and services with less cost. LTE aims at realizing an E-UTRAN (Evolved Universal Terrestrial Radio Access Network).

In a universal mobile telecommunications system (UMTS), when a wireless transmit/receive unit (WTRU) is camped on a cell (i.e., when the WTRU has chosen a cell and is tuned to that cell's control channel), it regularly searches for a better cell according to a set of criteria. If a better cell is found, the better cell is selected and the WTRU will camp on the better cell. In earlier UMTS systems, the WTRU could perform cell reselection either in Idle mode, forward access channel (FACH) mode, or paging channel (PCH) mode. In LTE, there are only two states: LTE_Idle and LTE_Active. The WTRU can perform cell reselection only in the LTE_Idle state.

In previous UMTS systems, before the WTRU decides to camp on a cell, it needs to check some basic criteria for the current cell it is camping on. The conditions Squal>0 (cell selection quality value) and Srxlev>0 (cell selection reception level value) need to be satisfied for a WTRU to camp on a cell, where Squal is measured as:

$$Squal = Ec/Io - Qqualmin \qquad \text{Equation (1)}$$

where Ec/Io (the ratio of the energy of the pilot signal being measured to the total power in the channel) is measured by the WTRU and the value Qqualmin (the minimum required quality level in the cell) is read from system information block (SIB) 3 which is broadcast by the system and includes cell selection and reselection information. Srxlev is measured as:

$$Srxlev = RSCP - Qrxlevmin - \max(UE\_TXPWR\_MAX\_RACH - P\_MAX, 0) \qquad \text{Equation (2)}$$

where the received signal code power (RSCP) is measured by the WTRU and Qrxlevmin (the minimum required reception level in the cell) and UE_TXPWR_MAX_RACH (the maximum transmission power level a WTRU may use when accessing the cell on the random access channel (RACH)) are read from SIB 3. P_MAX is the maximum radio frequency output power of the WTRU.

Other than Qqualmin, Qrxlevmin, and UE_TXPWR_MAX_RACH, a few other parameters are transmitted in SIB 3 and SIB 11 for cell reselection. The following parameters are transmitted in SIB 3.

Sintrasrch (optional) is the threshold for triggering intra-frequency measurements. The WTRU should measure the intra-frequency neighbor cells when Squal≤Sintrasrch. The WTRU will always measure the intra-frequency neighbor cells when Sintrasrch is not specified.

Sintersrch (optional) is the threshold for triggering inter-frequency measurements. The WTRU should measure the inter-frequency neighbor cells when Squal≤Sintersrch. The WTRU will always measure the inter-frequency neighbor cells when Sintersrch is not specified.

SsearchRAT (optional) is the threshold for triggering inter-RAT measurements. The WTRU should measure the inter-RAT neighbor cells when Squal≤SsearchRAT. The WTRU will always measure the inter-RAT neighbor cells when SsearchRAT is not specified.

Qhyst1s is used in ranking the serving cell based on RSCP.
Qhyst2s is used in ranking the serving cell based on Ec/Io.
Qqualmin is the minimum required quality measure in the cell, based on Ec/Io.
Qrxlevmin is the minimum required reception level in the cell, based on RSCP.
UE_TXPWR_MAX_RACH is the maximum allowed uplink (UL) transmission (TX) power a WTRU may use when accessing the cell on the RACH.
Treselection is the value of a timer that indicates an amount of time that the neighbor cell should meet cell reselection criteria for the WTRU to reselect to that cell.
Cell Selection and Reselection Quality Measure are either Ec/Io or RSCP, and specify the measurement quantity that the ranking should be based on.

The following parameters are transmitted in SIB 11, which relate to neighbor cell information.

Neighbor List (work on in LTE to define reduced or no neighbor cell list (NCL)).
Qoffset1s,n is the Quality Offset used to rank a cell based on RSCP.
Qoffset2s,n is the Quality Offset used to rank a cell based on Ec/Io.
UE_TXPWR_MAX_RACH is the maximum allowed UL TX power for a neighbor cell.
Qqualmin is the minimum required quality measure based on Ec/Io.
Qrxlevmin is the minimum required reception level based on RSCP.

Using these parameters, the WTRU is able to rank its serving cell and the neighbor cells. For the UMTS cell, the serving cell ranking is given as:

$$\text{Rank\_}s = RSCP + Qhyst1 + Qoffmbms \qquad \text{Equation (3)}$$

For UMTS cells (neighbor inter-frequency), the neighbor cell ranking is given as:

$$\text{Rank\_}n = RSCP - Qoffset1 + Qoffmbms \qquad \text{Equation (4)}$$

and for GSM cells:

$$\text{Rank\_}n = RSSI - Qoffset1 + Qoffmbms \qquad \text{Equation (5)}$$

Similar ranking equations can be used when the measurement quantity is Ec/Io.

The signaled value Qoffmbms is added to those cells (serving or neighboring) belonging to the multimedia broadcast-multicast service (MBMS) preferred frequency layer (PL).

In LTE since there are two systems to reselect to, UTRAN and GERAN, it also helps to look at the GERAN-UTRAN cell reselection procedure. The following are three parameters used in GERAN to UMTS cell reselection.

Qsearch_I: if the strength of the serving GSM cell falls below this value, then the WTRU will start taking measurements.

FDD_Qoffset: the amount that the WCDMA cell's RSSI must be higher than the serving GSM cell's RSSI.

FDD_Qmin: a minimum threshold for Ec/No for UTRAN FDD cell re-selection.

The radio resource layer (RR) in GSM compares EcIo_Avg with FDD_Qmin dB. If EcIo_Avg is less than FDD_Qmin dB then there is no cell reselection. If EcIo_Avg is greater than FDD_Qmin, then compare the WCDMA cell to the serving GSM cell. The WCDMA neighbor cell is better if the WCDMA cell's RSCP is greater than the GSM cell's RSSI+FDD_Qoffset for FDD_Qoffset≠0 or if the WCDMA cell's RSCP is greater than the GSM cell's RSSI for FDD_Qoffset=0.

Using the above criteria for cell reselection, a number of factors like cell loading and WTRU bandwidth capability have not been considered. These factors are relevant in LTE with orthogonal frequency division multiplexing (OFDM) as the physical layer medium. In addition, there are other factors or drivers that may be considered in cell reselection which are described in the table below. In the table, L→L indicates LTE to LTE inter-frequency mobility; L→U indicates LTE to UTRAN inter-RAT mobility; U→L indicates UTRAN to LTE inter-RAT mobility; L→G indicates LTE to GERAN inter-RAT mobility; and G→L indicates GERAN to LTE inter-RAT mobility. In the table, a value of "X" indicates that the driver is required, a value of "(X)" indicates that the driver is optional, and a blank space indicates that the driver is not required.

TABLE 1

Drivers for Mobility Control during IDLE (cell reselection) for Inter-RAT

| # | Drivers | Applicability | | | | | Necessary features to support drivers |
|---|---|---|---|---|---|---|---|
| | | L→L | L→U | U→L | L→G | G→L | |
| 1 | Radio condition | X | X | X | X | X | Inter-frequency/RAT measurements (solutions to mitigate measurement load should be considered, e.g., S-criteria); Cell reselection and reselection criteria. |
| 2 | Camp load balancing | X | X | X | (X) | (X) | Mechanism to prioritize cell reselection to certain layer/RAT, depending on the loading of layers/RATs; Load information exchange (not needed if balancing is inadaptive, i.e., only based on subscriber penetration on each band/RAT). |
| 3 | Traffic load balancing | | | | | | N/A |
| 4 | WTRU capability | (X) | X | X | X | X | Mechanism to prioritize cell reselection to certain layer/RAT, depending on the WTRU capability. |
| 5 | HCS | (X) | (X) | (X) | (X) | (X) | Mobility detection (e.g., number of crossed cells); Mechanism to prioritize cell reselection to certain layer/RAT, depending on the WTRU speed (e.g., HCS mechanism as in UTRAN). |
| 6 | Network sharing | X | X | X | X | (X) | Mechanism to direct the WTRU to the appropriate PLMN at a network sharing border; Mechanism to restrict WTRU measurements and reselection to cells that are entitled to access. |
| 7 | Private networks/home cells | X | (X) | X | | (X) | Mechanism to prioritize reselection to private/home cells that are entitled to access; Mechanism to restrict WTRU measurements and reselection to cells that are entitled to access; Other unidentified features, FFS. |
| 8 | Subscription/Policy based mobility control | X | X | X | (X) | (X) | Mechanism to prioritize cell reselection to certain layer/RAT, depending on the subscription information or any other operator policy (e.g., for L→L there may be cases where an operator has policy in allocating WTRUs to certain frequencies due to different carrier bandwidths). |

TABLE 1-continued

Drivers for Mobility Control during IDLE (cell reselection) for Inter-RAT

| | | Applicability | | | | | |
|---|---|---|---|---|---|---|---|
| # | Drivers | L→L | L→U | U→L | L→G | G→L | Necessary features to support drivers |
| 9 | Service based mobility control | | | | N/A | | |
| 10 | MBMS | X | (X) | X | | | Mechanism to prioritize cell reselection to the layer/RAT, depending on whether the WTRU requires reception of a certain MBMS transmission. |

A procedure needs to be defined on how the WTRU and the network would signal these parameters to each other and how the WTRU would use these parameters in its cell reselection equations. Moreover, some parameters for cell reselection can hold priority over other parameters in some scenarios. These factors also have to be taken into account in designing an overall procedure for cell reselection. Since there are two systems to which LTE could reselect to, it also needs to be seen whether some parameters could be optimized for cell reselection.

Some parameters for inter-RAT cell reselection have been proposed and are mentioned below. The present disclosure describes the inter-RAT cell reselection algorithm, mentioning the offsets and radio condition-based parameters that need to be signaled for inter-RAT cell reselection from LTE. Also proposed is how the cell reselection algorithm could be defined in LTE to take into account both UTRAN and GSM systems.

SUMMARY

A method for performing cell reselection first determines a current cell selection quality value. The cell selection quality value is compared to a predetermined threshold. Measurements of neighboring cells are taken if the cell selection quality value is less than or equal to the predetermined threshold. Measurements can be taken of intra-frequency cells, inter-frequency cells, and inter-radio access technology cells. If a neighboring cell is found that is better than the current cell based on the measurements, then the better neighbor cell is reselected to.

BRIEF DESCRIPTION OF THE DRAWINGS

A more detailed understanding may be had from the following description, given by way of example in conjunction with the accompanying drawings, wherein:

FIG. 2 is a flowchart of a method for selecting a suitable cell to reselect to;

DETAILED DESCRIPTION

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

The different radio condition-related parameters that can be used for both LTE to 3GPP and LTE to non-3GPP inter-RAT cell reselection are first described and then the cell reselection algorithm is described.

Measurement Quantities

In previous UMTS versions, the measurement quantity was Ec/Io or RSCP. However, in LTE the measurement quantity has not yet been decided. The following can be used as measurements in LTE: Reference Symbol Received Power (RSRP), which can be used analogous to RSCP, and Reference Symbol Received Quality (RSRQ), which can be used analogous to Ec/Io.

While the following discussion uses RSRP and RSRQ as measurement quantities, other measurement quantities could be used. The following solutions of adaptive cell reselection and handover can be applied to both current UMTS systems and LTE. For example, in the equations that follow, the quantity RSRQ may be substituted by any other suitable "signal quality" measure, while the quantity RSCP may be substituted by any other suitable "signal level" measure, or any other suitable measures.

Basic Cell Reselection Procedure

Figure 1:
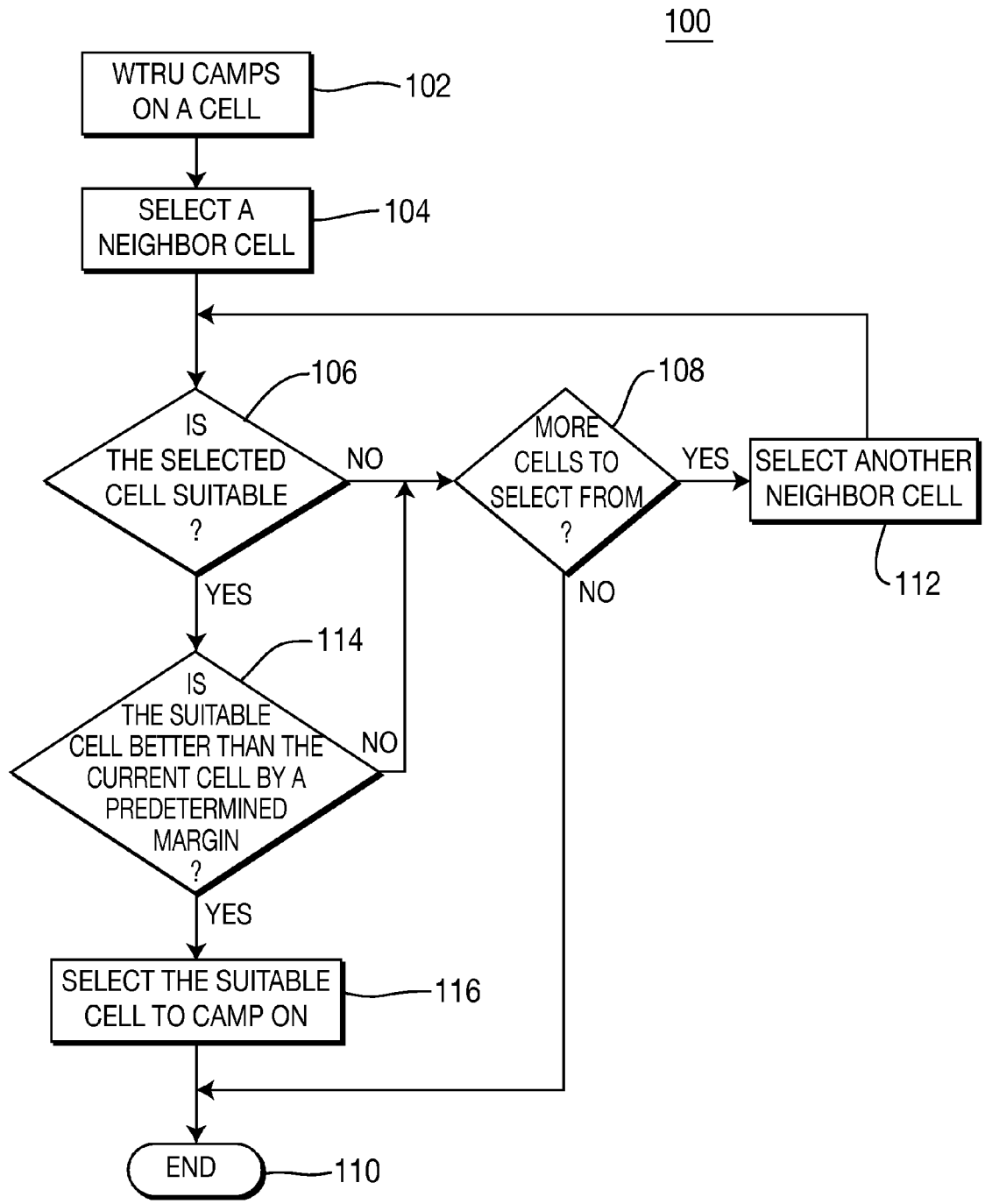
FIG. 1 is a flowchart of a basic cell reselection procedure.

FIG. 1 is a flowchart of a basic cell reselection procedure 100. A WTRU is initially camped on a cell (the current serving cell; step 102). The WTRU selects a neighbor cell (step 104) and evaluates the selected cell to determine if it is suitable to camp on (step 106). If the selected cell is not suitable, then a determination is made whether there are more neighbor cells that have not yet been evaluated (step 108). If there are no more cells to evaluate, the method terminates (step 110). If there are more cells to evaluate (step 108), the WTRU selects another neighbor cell (step 112) and evaluates the selected cell to determine if it is suitable to camp on (step 106).

If the selected cell is suitable to camp on (step 106), then a determination is made whether the suitable cell is better than the current serving cell by a predetermined margin (step 114). The reason for wanting the suitable cell to be better than the serving cell by a predetermined margin is so that the reselection procedure can avoid reselecting to a cell that is only slightly better than the current serving cell. By requiring the margin of difference in quality, unnecessary cell reselections (which would waste WTRU battery power) can be avoided.

If the suitable cell is not better than the current serving cell by the predetermined margin, then a determination is made whether there are more neighbor cells that have not yet been evaluated (step 108) and the method 100 continues as described above. If the suitable cell is better than the current serving cell by at least the predetermined margin (step 114), then the suitable cell can be selected to camp on (step 116) and the method terminates (step 110). Once a suitable cell to camp on has been found, there is no need to keep searching for additional possible suitable cells, as the additional searching would waste the WTRU's battery power.

Parameters Used for the Reselection Procedure

For LTE to GERAN handovers, parameters similar to those used in UTRAN to GERAN handovers may be used. For LTE to UTRAN handovers, parameters similar to those used in GERAN to UTRAN handover may be used. These parameters may be extended to include LTE to non-3GPP RAT parameters, which may also be applicable to WCDMA (UTRAN), or GERAN to non-3GPP RAT. Below are defined parameters, other than ARFCN (Absolute Radio Frequency Channel Number) and UARFCN (UMTS Absolute Radio Frequency Channel Number), that are signaled to the WTRU for GSM and UTRAN measurements.

The following parameters are specific to inter-RAT cell reselection and parameters like "Qqualmin" or "cell reselection or Quality Measure" from previous UMTS systems would also be needed. It is noted that the parameter names may change, but the use of similar parameters would not have an adverse effect on the cell reselection algorithm described below.

1. SsearchRAT. The WTRU should start measuring the inter-RAT cells when Squal is less than or equal to SsearchRAT for LTE cells, where $$Squal = RSRQ - Qqualmin \quad \text{Equation (6)}$$

and Qqualmin is signaled by the network. If the network desires to have different thresholds for different RATs, it can signal different values of SsearchRAT for each of the different RATs supported. If at any measurement cycle Squal is greater than SsearchRAT, the WTRU stops measuring the inter-RAT cells.

Alternatively, the network may want to configure the WTRU to always measure certain non-3GPP RATs. If there is non-3GPP system coverage (i.e., WiMax coverage overlapping 3GPP coverage), the network may want to give priority to the non-3GPP RAT even if the signal or service quality of the 3GPP system is good (i.e., meaning that the measurements have not been triggered or the serving signal strength is above a particular threshold). This may be preferable if the network or the user wants the WTRU to connect to another RAT whenever it is available (i.e., for billing purposes). This priority configuration may be signaled to the WTRU via broadcast information, signaled via dedicated messaging, preconfigured in the WTRU (i.e., in the (U)SIM), or by setting the SsearchRAT value for the non-3GPP system to a large value such that the WTRU measures the inter-RAT cells even when the signal quality of the 3GPP is good.

2. Tmeas. The number of seconds between two consecutive measurements in the LTE_Idle mode. Based on the length of a discontinuous reception (DRX) cycle, this parameter would take measurements every "X" DRX cycles.

If this parameter is signaled, it is also proposed that the WTRU be allowed to make measurements on the inter-RAT cells if the S criteria on the serving cell were to fail "N" consecutive DRX cycles, where N is less than or equal to X and N is in the range of (1 ... X). The S criteria can be defined in a similar way as in previous UMTS systems, i.e., Squal is defined as above in Equation 6 and $$Srxlev = RSRP - Qrxlevmin - \max(UE\_TXPWR\_MAX\_RACH - P\_MAX, 0) \quad \text{Equation (7)}$$

RSRP is measured by the WTRU and Qrxlevmin and UE_TXPWR_MAX_RACH are transmitted by the network.

If the value of Tmeas is not signaled to the WTRU, it would be left to the WTRU implementation on the frequency with which the inter-RAT cells should be measured. Multiple values of Tmeas can also be signaled, which can be used by the WTRU depending on the channel conditions. For example, if the WTRU is experiencing a bad channel condition, it can measure the channel more frequently. A bad channel condition exists when the serving cell's signal falls below a predetermined threshold. The predetermined threshold can be configured by the network or the WTRU could internally choose the threshold. Accordingly, the predetermined threshold is implementation-specific. If the WTRU is experiencing a good channel condition, it can measure the channel less frequently. Alternatively, a single value of Tmeas can be signaled along with a scaling factor which can be multiplied by the WTRU when it wants to reduce the measurement interval during bad channel conditions. Different values of Tmeas for WCDMA, GSM, or other non-3GPP technologies could be signaled.

3. Qmin. This is the threshold above which the quality of the UTRAN, GERAN, and other non-3GPP cells should be for the WTRU to rank those cells. It is noted that different parameters might need to be signaled for UTRAN, GERAN, and other non-3GPP cells. If this parameter is not signaled, the WTRU would rank all the cells it detects on the neighboring RAT, thereby increasing the number of rankings and comparisons it needs to do. It is noted that the quantity indicated by Qmin depends on the type of measurement to be taken at the WTRU for the serving cell. For example, if the WTRU measures RSRP, then Qmin is defined in similar units.

4. Tresel. This is the interval for which the WTRU needs to wait to reselect to the WCDMA, GSM, or a non-3GPP RAT cell after an inter-RAT neighbor cell rank has been evaluated to be higher than the serving cell rank. If Tresel is not sent by the network, it could be implementation defined. The same value of Tresel could be used for intra-frequency cells, inter-frequency cells, or inter-RAT cells. In one implementation, different values of Tresel could be signaled by the network for each event.

5. Qhyst. This is the offset that is added to the serving cell ranking in LTE. The rank of the serving cell in LTE is determined by:

$$Rank\_s = RSRP + Qhyst + (\text{certain other parameters}) \quad \text{Equation (8)}$$

The "certain other parameters" relate to cell loading, WTRU bandwidth, or subscription capabilities. It is noted that the network will need to signal two separate values of Qhyst (e.g., Qyst1 and Qhyst2) as in previous UMTS systems for RSRP and RSRQ.

6. Qoffset. This is the offset that is subtracted from the neighbor cell ranking. The rank of the neighbor cell is determined by:

$$Rank\_n = RSRP - Qoffset + (\text{certain other parameters}) \quad \text{Equation (9)}$$

It is generally preferable for the WTRU to stay camped on the current cell for as long as possible. Before reselecting to a neighbor cell, the neighbor cell should be at least some minimum amount (Qoffset) better than the serving cell. Requiring the neighbor cell to be at least Qoffset better than the serving cell avoids reselecting to a marginally better cell, which would be a waste of WTRU battery power and system resources.

It is noted that the parameters Qhyst and Qoffset can be common to intra-frequency systems, inter-frequency systems, and inter-RAT systems, thereby reducing the number of parameters to be signaled. Different parameters may be signaled to optimize reselection across different systems. For non-3GPP systems, the network may choose to broadcast additional values for Qhyst and Qoffset, specific to non-3GPP RATs. Also, when Qhyst and Qoffset are not signaled by the network, the WTRU would perform a comparison of the serving cell strength in LTE versus the serving cell strength in UTRAN, GERAN, or the non-3GPP RAT for ranking the cells. The network could signal different Qoffset or Qhyst values for each of the other RATs (3GPP and non-3GPP) in case it has a preference for one of the RATs.

7. GSM and UTRAN center frequencies/cell IDs. The LTE network will need to transmit the ARFCNs and the UARFCNs of the GSM and UMTS networks in the broadcast messages for the WTRU to measure on these networks. The network could also decide to transmit the BSIC (base station identity code) IDs for GSM cells and the PSCs (primary scrambling code) for UTRAN if it so desires. With this parameter, the network informs the WTRU of all the frequencies it should measure on.

8. Priority of inter-RAT reselection. This is an optional parameter signaled by the network which indicates if during inter-RAT reselection, WCDMA, GSM, or some non-3GPP inter-RAT cells need to be given priority over one another. This may be an enumerated field with the values WCDMA, GSM, or any other non-3GPP inter-RAT value. If this parameter is specified, then the specified RAT will be searched first. If no suitable cells are found in the specified RAT, then a search would be performed on the other RATs. If this parameter is not specified, then the WTRU would measure all RATs (WCDMA, GSM, and other non-3GPP RAT cells) in parallel and then reselect to the RAT with the better rank.

9. Non-3GPP RAT frequencies/cell ID. If the network wants the WTRU to measure on the cells from the non-3GPP RATs like WLAN, WiMax, etc., the network signals the parameters in the broadcast messages for the WTRU to measure on these networks. The network could also transmit the cell IDs for these cells. For example, the network may broadcast the specific cell IDs (i.e., the MAC for a WLAN, the BSID for WiMax), the frequency of operation of the listed cells, and any other physical layer information required by the WTRU to perform measurements on the non-3GPP RATs.

It is noted that the parameters GSM and UTRAN center frequencies/cell IDs and non-3GPP RAT frequencies/cell ID could be combined into a single parameter. Instead of signaling these parameters for inter-RAT and other cell reselection parameters for inter-frequency and intra-frequency through broadcast messages, the network could signal the parameters via dedicated messages. The WTRU would then store the received parameters to use when it enters the LTE_Idle mode. Using dedicated messages reduces the extra overhead associated with broadcasting a large number of parameters.

Algorithm for the Reselection Procedure

Based on the above-mentioned parameters, the following algorithm for cell reselection is proposed. Although the method described herein applies to LTE, it is equally applicable to any 3GPP technology (e.g., WCDMA Release 8) which supports handover/cell reselection to a non-3GPP RAT.

Generally, the WTRU should follow an order when it decides to reselect to another RAT. If the current serving cell is no longer suitable for the WTRU to camp on, the WTRU first searches for all cells that are on the same frequency as the current cell. Second, the WTRU searches for all neighboring frequencies that belong to the same RAT as the current serving cell. Third, the WTRU searches for a neighboring RAT. The WTRU will only step down through the searching process (from intra-frequency to inter-frequency to inter-RAT) if the WTRU cannot locate a suitable cell at a higher level.

Figure 2:
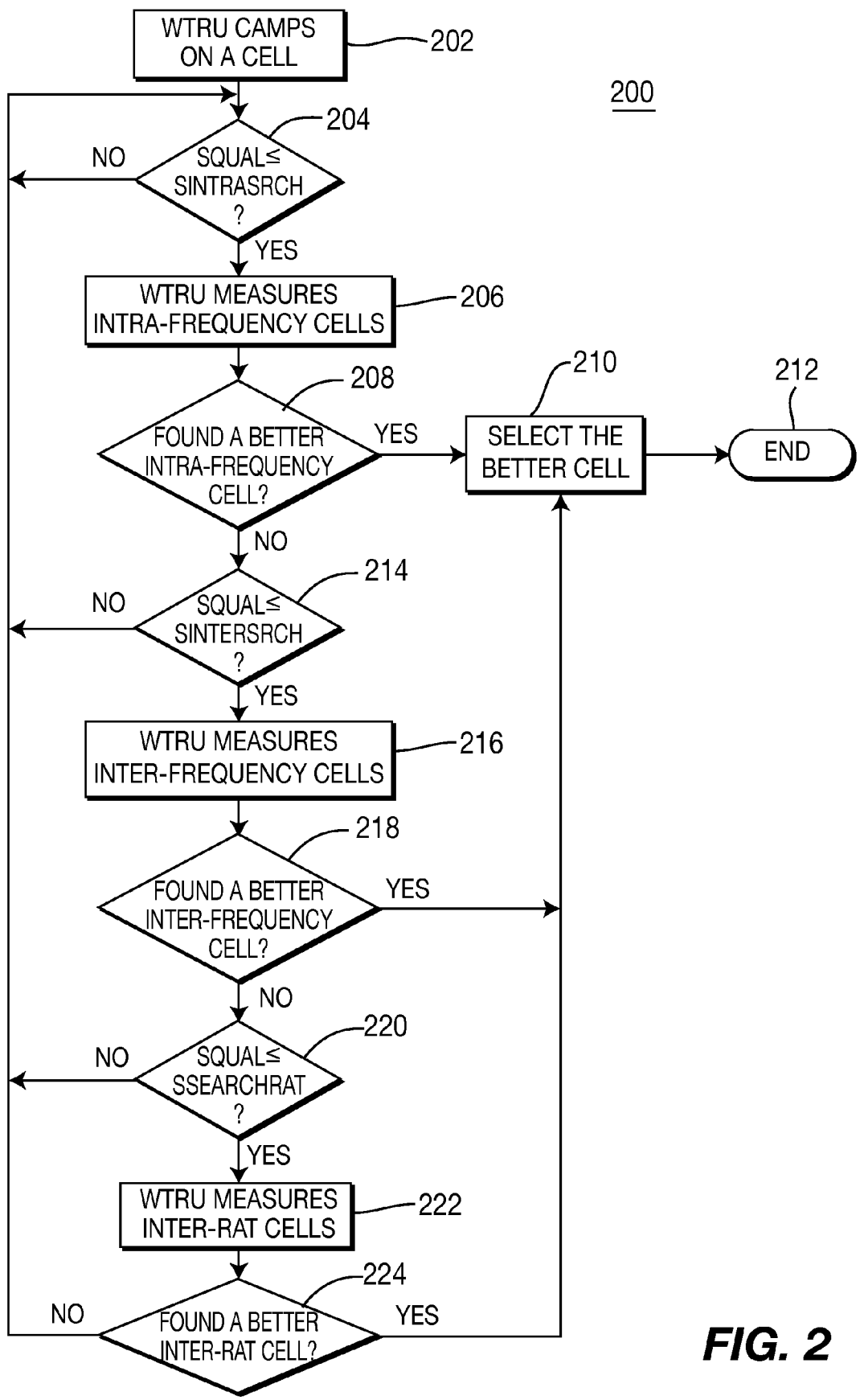

FIG. 2 is a flowchart of a method 200 for selecting a suitable cell to reselect to. A WTRU is initially camped on a cell (the current serving cell; step 202). When the quality of the current serving cell falls below a particular threshold, i.e., when Squal (as defined above) is less than or equal to Sintrasrch (step 204), the WTRU begins to measure other intra-frequency cells (step 206). If the WTRU finds an intra-frequency cell that ranks better than the serving cell (step 208), then the WTRU selects the better cell to camp on (step 210) and the method terminates (step 212).

If the WTRU cannot find any intra-frequency cells in the measurement procedure that rank better than the serving cell or any neighbor cell which meets the S criteria (step 208), then the WTRU evaluates inter-frequency cells to try to stay in LTE. For inter-frequency searching, the measurements are started when Squal is less than or equal to Sintersrch (step 214), where Sintersrch is transmitted by the network. If Squal is less than or equal to Sintersrch, then the WTRU starts to measure the inter-frequency cells (step 216).

Alternatively, when the intra-frequency search criteria is met, the WTRU measures both the intra-frequency cells and inter-frequency cells in parallel. As another alternative, the intra-frequency and inter-frequency search criteria can be evaluated in parallel, and then take the measurements in parallel if both criteria are met.

If neither Sintrasrch nor Sintersrch are transmitted by the network, the WTRU would then always make measurements on the intra-frequency cells in LTE. For the inter-frequency cells, the WTRU could either make the measurements in parallel with the intra-frequency cells or make the inter-frequency measurements when the quality of the serving cell falls below a particular threshold, for example by failing the S criteria (i.e., Squal<0 or Srxlev<0).

If the WTRU finds an inter-frequency cell that ranks better than the serving cell (step 218), then the WTRU selects the better cell to camp on (step 210) and the method terminates (step 212).

If the WTRU cannot find any intra-frequency cells or inter-frequency cells which are suitable (step 218), the WTRU then evaluates the criteria for measuring the inter-RAT cells, i.e., Squal is less than or equal to SsearchRAT (step 220). If the parameter SsearchRAT is not transmitted by the network, then the WTRU would start measuring on the inter-RAT cells (which include WCDMA, GSM, and the non-3GPP inter-RAT cells) when the WTRU cannot find any suitable intra-frequency cells or inter-frequency cells.

Alternatively, once the intra-frequency criteria are not met, the WTRU could evaluate the inter-frequency criteria and the inter-RAT criteria together. If both criteria are satisfied, the WTRU could start measuring on both the inter-frequency cells and the inter-RAT cells at the same time. This could be a useful option when channel conditions are deteriorating rapidly. One example of when channel conditions are deteriorating rapidly is if the WTRU is moving away from the cell and out of the coverage of the current frequency. Alternatively, the WTRU may always measure certain 3GPP or non-3GPP RATs, even if the current 3GPP cell meets the criteria. This alternative may be preferable if the network configures the WTRU to always be connected to a certain network whenever the specific RAT has coverage (i.e., the other RAT has a higher priority or the WTRU is currently camped in a lower priority RAT).

If any of the criteria for measuring inter-RAT cells are met (step 220) or if the WTRU is configured to always measure, the WTRU starts measuring the inter-RAT cells (step 222). If the WTRU finds an inter-RAT cell that ranks better than the serving cell, then the WTRU selects the better cell to camp on (step 210) and the method terminates (step 212). If the WTRU does not find any inter-RAT cell that ranks better than the serving cell (step 224), then the WTRU stays camped on the current serving cell. The WTRU monitors the quality of the current serving cell to determine if the quality goes below a particular threshold (step 204) as described above.

Performing Inter-RAT Searching

Figure 3:
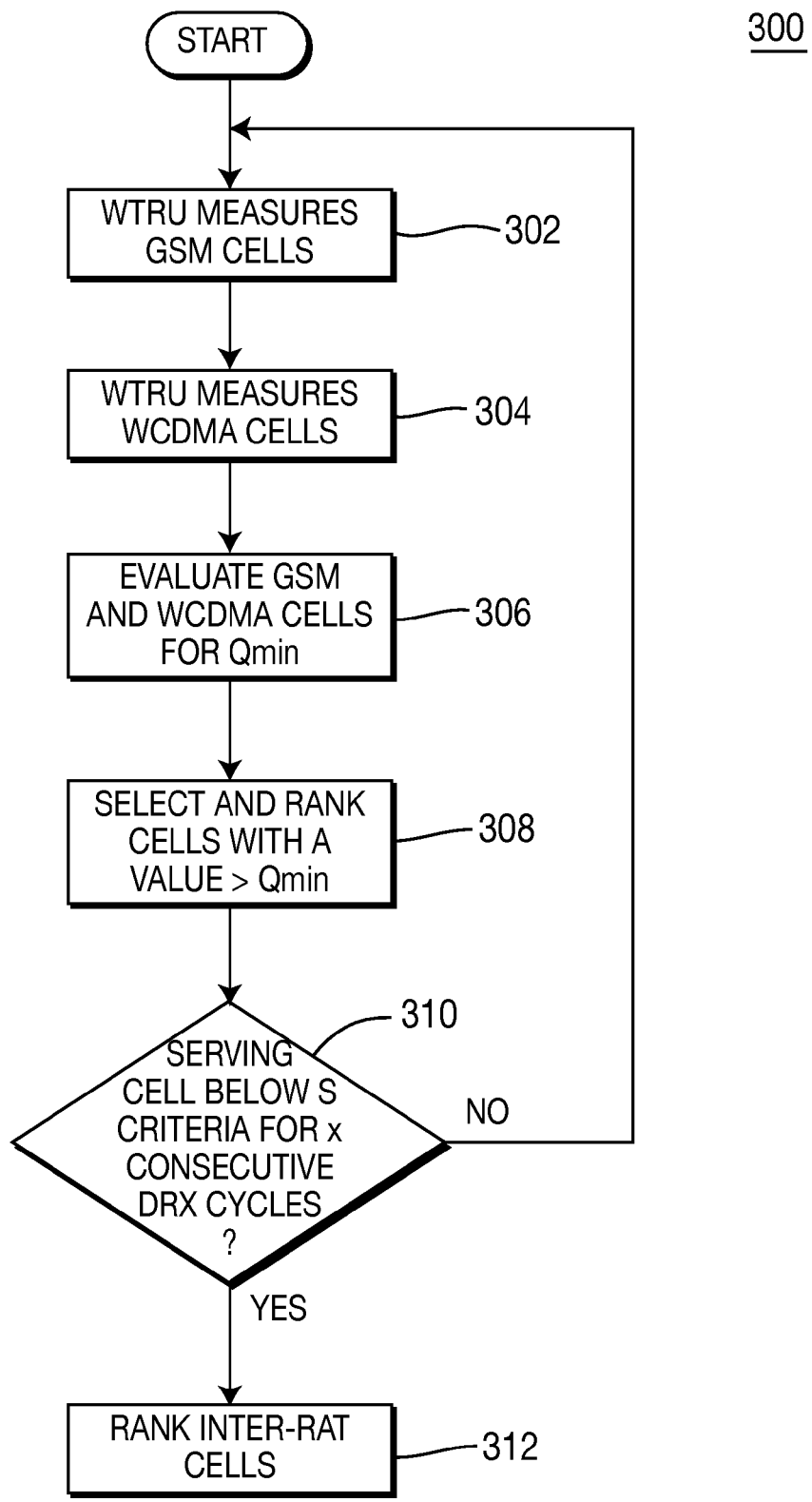
FIG. 3 is a flowchart of a method for searching for an inter-RAT cell.

FIG. 3 is a flowchart of a method 300 for searching for an inter-RAT cell, which can be used by the method 200 when the WTRU measures inter-RAT cells (step 222). After the inter-RAT search criteria have been satisfied, the WTRU (depending whether a priority is assigned or not) can start measuring one or a combination of the following RATs.

It is noted that the order in which the WTRU evaluates the different RATs can vary and the method 300 shows one example. The order of the measurements can change and does not affect the overall operation of the method 300. As another example, GSM and WCDMA cells could be measured in parallel. Furthermore, a priority of measurement order for the RATs may be assigned by the network. Unless otherwise specified, a 3GPP cell will have priority over a non-3GPP cell, but the network could indicate a preference for a non-3GPP RAT over a 3GPP RAT. This preference could be signaled via SIBs at WTRU power-up or via dedicated signaling, which permits the preferences to be changed in real time.

The WTRU measures GSM cells (step 302). The GSM cells for the ARFCN are listed in the system information messages. If no ARFCNs are listed in the SIBs, the WTRU performs a full frequency scan to detect the GSM frequencies.

The WTRU measures WCDMA cells (step 304). For the WCDMA cells, the WTRU first needs to perform a pilot identification for UARFCNs listed in the SIBs. Alternatively, if no UARFCNs are listed, the WTRU performs a full frequency scan to detect the WCDMA frequencies. To perform the pilot identification, the WTRU performs a three step process of decoding the P-SCH (primary synchronization channel), decoding the S-SCH (secondary synchronization channel), and decoding and latching onto the scrambling code. Once the pilot identification is complete, the WTRU measures the WCDMA cell. If the network signals the PSC along with the UARFCN, then the WTRU need not perform the pilot identification process, but can directly measure on the PSC.

For the non-3GPP RATs, the WTRU starts to measure the cells for the frequencies listed in the SIBs. If no frequencies are listed, then the WTRU performs a full frequency scan to detect the frequencies. For some non-3GPP RATs, the WTRU might need to perform a cell identification before it can start measuring on the cells, as is the case with WCDMA.

The WTRU then evaluates the GSM, WCDMA, and/or non-3GPP RAT cells, depending on the configuration, thresholds, and assigned priorities, with the value of Qmin transmitted by the network (step 306). The WTRU only selects the cells which have a quality greater than Qmin to trigger cell ranking (step 308).

The WTRU performs the inter-RAT rankings every Tmeas interval. If the value of Tmeas is not signaled, the interval between two consecutive rankings could be implementation defined. For developing the equations for ranking, the WTRU could use the offsets and other radio condition-related parameters as mentioned above and use existing cell reselection procedures and incorporate other drivers.

In case the serving cell falls below the S criteria for X consecutive DRX cycles (step 310) and no inter-frequency cells are found, the WTRU could immediately rank the inter-RAT cells (step 312) even if the Tmeas interval has not been completed.

During these reselections, if the WTRU ranks an inter-RAT cell higher than the LTE cell, the WTRU could start the Tresel timer if signaled by the network or could wait for an implementation dependent value to perform the reselection. Alternatively, the WTRU may rank an inter-RAT cell even if it is not higher than the LTE cell. For example, this may occur if the network has configured the WTRU to try to connect to a WiMax cell if available and even if the 3GPP cell fulfills the criteria (i.e., the signal strength is good). The other RAT cells are ranked and the only criteria they need to fulfill may be that the signal strength measured on the other RAT is higher than the configured thresholds for a given period of time. If the criteria is met, then the WTRU may reselect to the other RAT.

If at the end of the Tresel period, a WCDMA cell is found to be stronger, the WTRU first performs a PSC ID reconfirmation by taking measurements on the detected scrambling code to ensure that the PSC to which it is planning to reselect is a valid PSC. The WTRU would then reselect to the WCDMA cell.

If at the end of the Tresel period, a GSM cell is found to be stronger, the WTRU first performs a BSIC Identification and once a BSIC is identified, the WTRU reselects to the GSM cell. A BSIC reconfirmation may or may not be required, depending on whether the BSIC ID was already specified in the neighbor list.

If at the end of the Tresel period, a non-3GPP RAT cell is found to be stronger, the WTRU might need to identify the cell or reconfirm that the cell exists. The WTRU can then reselect to the non-3GPP RAT cell.

It is noted that if a RAT priority is indicated by the network, then the WTRU would first run the reselection algorithm on the first RAT (a WCDMA, GSM, or a non-3GPP RAT cell as indicated by the priority) and then proceed with trying to reselect to the other RATs if the preferred RAT does not have any suitable cells. The procedure for measuring and identifying the PSC, the BSIC, or the non-3GPP RAT cell would remain the same.

Once the WTRU has reselected to a new cell in the RAT, it reads the system information messages to acquire the cell-specific system information. The WTRU may then send a location update to the network to inform it of the WTRU's current location. The network then sends a signal back to the source RAT/eNodeB informing the network of the WTRU's final location.

In the above scenario, the radio resource control (RRC) on the LTE side is assumed to take all of the measurements on the other 3GPP RAT or the non-3GPP RAT. Alternatively, there could be a separate AS (access stratum) for the non-3GPP side which could take all of the measurements or a new stack for the non-3GPP side for which both the AS and NAS could be different. The 3GPP and the non-3GPP protocol stacks could communicate with each other across a common interface.

In the above cases, a cell reselection procedure to move to the neighbor 3GPP RAT or non-3GPP RAT is defined. In some cases, the network configures the WTRU to move to the neighbor RAT using a cell selection procedure instead of reselection. The cell selection procedure would be used in a case where the WTRU does not have a call established with the network and the network does not want the WTRU to count through the various cell reselection timers. The network could just direct the WTRU to enter the Idle mode and select back to the non-3GPP cell, which may be a faster approach. In such a case, it would not use the above-mentioned criteria, and would use the radio signal strength criteria or possibly the S criteria for selecting another cell.

Either the RRC (if it is taking measurements on the non-3GPP RAT) or the non-3GPP RAT stack present on the WTRU might suspend its measurements to the other RAT during high priority services like MBMS. Alternatively, if the current signal strength in the serving cell is weak, the WTRU might suspend its MBMS services and continue measuring on the non-3GPP RAT.

WTRU Construction

Figure 4:
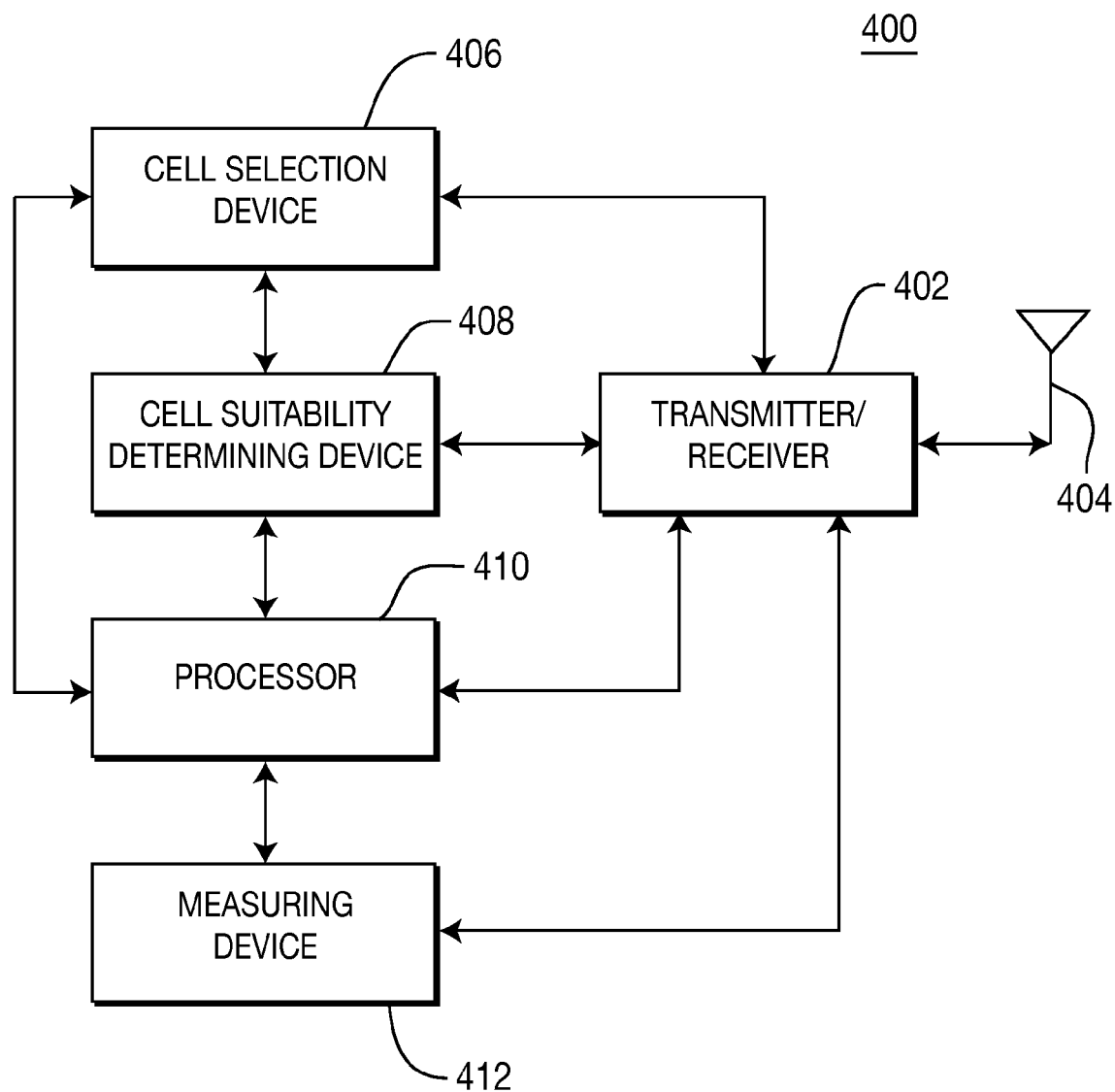
FIG. 4 is a block diagram of a WTRU configured to reselect to an inter-RAT cell.

FIG. 4 is a block diagram of a WTRU 400 configured to reselect to an inter-RAT cell. The WTRU 400 includes a transmitter/receiver 402 connected to an antenna 404. A cell selection device 406 is configured to select neighbor cells for determining whether the cell is suitable for the WTRU to camp on and is in communication with the transmitter/receiver 402. A cell suitability determining device 408 is configured to determine whether a selected cell is suitable for the WTRU to camp on and is in communication with the transmitter/receiver 402 and the cell selection device 406. A processor 410 is configured to perform comparisons of measurements to thresholds and is in communication with the transmitter/receiver 402, the cell selection device 406, and the cell suitability determining device 408. A measuring device 412 is configured to take measurements of neighboring cells and is in communication with the transmitter/receiver 402 and the processor 410.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for performing cell reselection implemented in a wireless transmit receive unit (WTRU), the method comprising:

receiving priority information in a current cell associated with a current radio access technology (RAT), wherein the priority information is indicative of a cell reselection priority of an inter-RAT cell associated with a candidate RAT relative to the current cell associated with the current RAT;

determining whether the inter-RAT cell associated with the candidate RAT has a higher priority than the current cell associated with the current RAT based on the priority information;

determining a cell selection value of the current cell;

determining to perform quality measurements of the inter-RAT cell associated with the candidate RAT on condition that it is determined that the inter-RAT cell associated with the candidate RAT has a higher priority than the current cell associated with the current RAT, wherein the quality measurements of the inter-RAT cell are performed irrespective of the cell selection value of the current cell based on the inter-RAT cell associated with the candidate RAT has having a higher priority than the current cell associated with the current RAT; and determining to perform quality measurements of the inter-RAT cell associated with the candidate RAT on condition that it is determined that the inter-RAT cell associated with the candidate RAT does not have a higher priority than the current cell in the current RAT and that the cell selection value of the current cell is less than or equal to a predetermined threshold, wherein the WTRU considers the cell selection value of the current cell when determining whether to perform the quality measurements of the inter-RAT cell based on the inter-RAT cell associated with the candidate RAT not having a higher priority than the current cell associated with the current RAT.

2. The method as in claim 1, wherein one of the current cell or the inter-RAT cell is a long term evolution (LTE) cell in an evolved universal terrestrial radio access network (E-UTRAN).

3. The method as in claim 1, wherein one of the current cell or the inter-RAT cell is a wideband code division multiple access (WCDMA) cell.

4. The method as in claim 1, further comprising:

determining to perform quality measurements of the inter-RAT cell associated with the candidate RAT irrespective of a current state of the WTRU on condition that it is determined that the inter-RAT cell associated with the candidate RAT has a higher priority than the current cell associated with the current RAT.

5. The method as in claim 4, wherein the current state of the WTRU comprises a mobility state based on a speed of the WTRU.

6. The method as in claim 1, further comprising reselecting to the inter-RAT cell based on the quality measurement.

7. The method as in claim 6, further comprising performing a location update upon reselecting to the inter-RAT cell.

8. The method as in claim 1, wherein the quality measurements are evaluated periodically based on a time value signaled by an evolved universal terrestrial radio access network (E-UTRAN).

9. The method as in claim 1, wherein the inter RAT priority information includes frequency information for the inter-RAT cell.

10. The method as in claim 1, further comprising:
reselecting to the inter-RAT cell based on a signal strength measured for the inter-RAT cell being greater than a configured threshold for a predetermined period of time on condition that it is determined that the inter-RAT cell associated with the candidate RAT has a higher priority than the current cell associated with the current RAT.

11. The method as in claim 1, further comprising:
reselecting to the inter-RAT cell based at least in part on there being no cells in a higher priority RAT that meet cell reselection requirements on condition that it is determined that the inter-RAT cell associated with the candidate RAT does not have a higher priority than the current cell associated with the current RAT.

12. The method as in claim 11, further comprising:
reselecting to the inter-RAT cell based at least in part on the Inter-RAT cell being higher ranked than the current cell on condition that it is determined that the inter-RAT cell associated with the candidate RAT does not have a higher priority than the current cell associated with the current RAT.

13. The method as in claim 1, further comprising:
always determining to perform quality measurements of the inter-RAT cell associated with the candidate RAT on condition that it is determined that the inter-RAT cell associated with the candidate RAT has a higher priority than the current cell in the current RAT.

14. A wireless transmit receive unit (WTRU) for performing cell reselection, the WTRU comprising:
a receiver configured to receive priority information in a current cell associated with a current radio access technology (RAT), wherein the priority information is indicative of a cell reselection priority of an inter-RAT cell associated with a candidate RAT relative to the current cell associated with the current RAT; and
a processor configured to:
determine whether the inter-RAT cell associated with the candidate RAT has a higher priority than the current cell associated with the current RAT based on the priority information,
determine a cell selection value of the current cell,
determine to perform quality measurements of the inter-RAT cell associated with the candidate RAT on condition that it is determined that the inter-RAT cell associated with the candidate RAT has a higher priority than the current cell associated with the current RAT, wherein the WTRU is configured to perform the quality measurements of the inter-RAT cell irrespective of the cell selection value of the current cell based on the inter-RAT cell associated with the candidate RAT has having a higher priority than the current cell associated with the current RAT, and
determine to perform quality measurements of the inter-RAT cell associated with the candidate RAT on condition that it is determined that the inter-RAT cell associated with the candidate RAT does not have a higher priority than the current cell associated with the current RAT and that the cell selection value of the current cell is less than or equal to a predetermined threshold, wherein the WTRU is configured to consider the cell selection value of the current cell when determining whether to perform the quality measurements of the inter-RAT cell based on the inter-RAT cell associated with the candidate RAT not having a higher priority than the current cell associated with the current RAT.

15. The WTRU as in claim 14, wherein one of the current cell or the inter-RAT cell is a long term evolution (LTE) cell in an evolved universal terrestrial radio access network (E-UTRAN).

16. The WTRU as in claim 14, wherein the processor is configured to determine to perform quality measurements of the inter-RAT cell associated with the candidate RAT irrespective of a current state of the WTRU on condition that it is determined that the inter-RAT cell associated with the candidate RAT has a higher priority than the current cell associated with the current RAT.

17. The WTRU as in claim 16, wherein the current state of the WTRU comprises a mobility state based on a speed of the WTRU.

18. The WTRU as in claim 14, wherein the processor is further configured to reselect to the inter-RAT cell based on the quality measurements.

19. The WTRU as in claim 18, wherein the processor is further configured to perform a location update upon reselecting to the inter-RAT cell.

20. The WTRU as in claim 14, wherein the processor is configured to evaluate the quality measurements periodically based on a time value signaled by an evolved universal terrestrial radio access network (E-UTRAN).

21. The WTRU as in claim 14, wherein the priority information includes frequency information for the inter-RAT cell.

22. The WTRU as in claim 14, wherein the processor is further configured to reselect to the inter-RAT cell based on a signal strength measured for the inter-RAT cell being greater than a configured threshold for a predetermined period of time on condition that it is determined that the inter-RAT cell associated with the candidate RAT has a higher priority than the current cell associated with the current RAT.

23. The WTRU as in claim 14, wherein the processor is further configured to reselect to the inter-RAT cell based at least in part on there being no cells in a higher priority RAT that meet cell reselection requirements on condition that it is determined that the inter-RAT cell associated with the candidate RAT does not have a higher priority than the current cell associated with the current RAT.

24. The WTRU as in claim 23, wherein the processor is further configured to reselect to the inter-RAT cell based at least in part on the inter-RAT cell being higher ranked than the current cell on condition that it is determined that the inter-RAT cell associated with the candidate RAT does not have a higher priority than the current cell associated with the current RAT.

25. The WTRU as in claim 14, wherein the processor is configured to always determine to perform quality measurements on the inter-RAT cell associated with the candidate RAT on condition that it is determined that the inter-RAT cell associated with the candidate RAT has a higher priority than the current cell associated with the current RAT.

* * * * *

UNITED STATES PATENT AND TRADEMARK OFFICE
CERTIFICATE OF CORRECTION

PATENT NO.         : 8,706,115 B2
APPLICATION NO.    : 12/141356
DATED              : April 22, 2014
INVENTOR(S)        : Diana Pani et al.

It is certified that error appears in the above-identified patent and that said Letters Patent is hereby corrected as shown below:

In the Claims

Column 14, claim 1, line 26, delete "has" from the text that currently recites "RAT has having".

Column 15, line 1, delete "inter RAT" from the text that currently recites "wherein the inter RAT priority".

Signed and Sealed this
Twenty-ninth Day of March, 2016

Michelle K. Lee
*Director of the United States Patent and Trademark Office*